(12) United States Patent
Abbestam

(10) Patent No.: US 8,430,229 B2
(45) Date of Patent: Apr. 30, 2013

(54) LIFTING DEVICE FOR A CONVEYOR SYSTEM A CONVEYOR SYSTEM AND A METHOD

(75) Inventor: Göran Abbestam, Partille (SE)

(73) Assignee: FlexLink Components AB (SE)

( * ) Notice: Subject to any disclaimer, the term of this patent is extended or adjusted under 35 U.S.C. 154(b) by 349 days.

(21) Appl. No.: 12/677,254

(22) PCT Filed: Sep. 14, 2007

(86) PCT No.: PCT/SE2007/050652
§ 371 (c)(1),
(2), (4) Date: Jun. 16, 2010

(87) PCT Pub. No.: WO2009/035388
PCT Pub. Date: Mar. 19, 2009

(65) Prior Publication Data
US 2010/0252399 A1     Oct. 7, 2010

(51) Int. Cl.
*B23Q 7/14*         (2006.01)
*B65G 17/32*       (2006.01)

(52) U.S. Cl.
USPC ............... 198/463.3; 198/345.3; 198/346.1; 29/38.9

(58) Field of Classification Search ............ 198/345.1, 198/345.3, 346.1, 346.2, 463.3, 465.1; 29/38.9
See application file for complete search history.

(56) References Cited

U.S. PATENT DOCUMENTS

| | | | | |
|---|---|---|---|---|
| 4,646,915 A * | 3/1987 | Ohtaki et al. | | 198/346.2 |
| 5,039,270 A * | 8/1991 | Parks et al. | | 414/286 |
| 5,398,484 A * | 3/1995 | Kader | | 53/481 |
| 5,553,988 A * | 9/1996 | Horn et al. | | 414/416.03 |
| 5,873,165 A * | 2/1999 | Bode et al. | | 29/897.2 |
| 7,150,706 B2 | 12/2006 | Grob | | |
| 7,410,340 B2 * | 8/2008 | Bonora et al. | | 414/217.1 |
| 7,461,733 B2 * | 12/2008 | Dohi | | 198/346.3 |
| 2004/0132595 A1 | 7/2004 | Grob | | |

FOREIGN PATENT DOCUMENTS

DE  20304653 U1  4/2004
JP  61206717 A * 9/1986 ............. 198/345.3

OTHER PUBLICATIONS

"International Application Serial No. PCT/SE2007/050652, International Preliminary Report on Patentability completed Nov. 30, 2009", 11 pgs.
"International Application Serial No. PCT/SE2007/050652, International Search Report mailed May 30, 2008", 3 pgs.

* cited by examiner

*Primary Examiner* — Mark A Deuble
(74) *Attorney, Agent, or Firm* — Schwegman Lundberg & Woessner, P.A.

(57) ABSTRACT

Lifting device (1) for a conveyer system, comprising a housing (2) and a lift head (14), where the lift head (14) is adapted to hold a pallet (5). The lifting device (1) comprises a linear actuator (10) attached to a lift (14), said linear actuator (109) is adapted to lift a pallet (5) from a first, low position at the conveyor track to a second, raised position that is substantially vertical above the first position. The application also refers to a conveyer system and a method for lifting objects.

16 Claims, 5 Drawing Sheets

LIFTING DEVICE FOR A CONVEYOR SYSTEM A CONVEYOR SYSTEM AND A METHOD

RELATED APPLICATIONS

This application is a nationalization under 35 U.S.C. 371 of PCT/SE2007/050652, filed Sep. 14, 2007 and published as WO 2009/035388 A1 on Mar. 19, 2009, 7; which application and publication are incorporated herein by reference and made a part hereof.

TECHNICAL FIELD

The present invention relates to a lifting device for a conveyor system.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via transportation means, which are also known as pallets.

A pallet is conveyed along the conveying device comprising different work stations. In some cases, every work station will perform one operation on the transported object. In those cases, the work flow is designed such that every pallet will stop at every work station. In other cases, for example when different products or different versions of the same product are produced in the same product flow, all pallets do not have to stop at all the work stations.

If the conveying device is of a conventional type, in which all work stations are positioned after each other and the operations on the objects are performed synchronous, every pallet have to stop at each work station. If no operation is to be performed on an object at a specific work station, the object will have to wait at that work station until the operation on the previous object at that work station is ready, until the object can continue. All pallets are in this case released at the same time and moves at the same time. One advantage of such a system is that it is easy to predict the performance of the system. One disadvantage of such a system is that it is not very flexible. If the operation time at a work station is long, all objects will have to wait that time, even if there is no operation performed on all objects or if the operation time at another work station is considerably shorter. Thus, such systems are mostly used for a single product or when the differences in the products are small.

In other systems, the operations on the objects are performed asynchronous, i.e. the pallet stops at a work station where an operation is to be performed, and is released when the operation is ready. In such systems, a relatively large buffer is required between each work station in order to compensate for the different through-flow times of the products and for the different operation times at a work station.

Another way of compensating for different operation times at a work station is to use two or more work stations that perform the same task. They are often positioned close to each other, and the object is stopped at the work station that is free. In this way, the through-flow time of the system can be balanced in order to avoid bottlenecks in the system.

Normally, the operator setting up the system will try to coordinate the work so that every pallet spends the same length of time at each work station. Sometimes, it is difficult to coordinate the operation time at each work station. One solution, apart from using a buffer, is to locate some work stations along different sub-conveyors located on the side of the main conveyor. Such a solution will require extra space and extra parts, such as a drive motor and means to divert objects to the sub-conveyor. This solution will work in some cases, but in other cases, especially when the product flow is altered after production has started, it may not be possible to rebuild the conveying system with such a solution. There is thus room for improvements.

DISCLOSURE OF INVENTION

An object of the invention is therefore to provide a lifting device for a conveyor system and a method for lifting objects at a conveyor system.

With a lifting device for a conveyor system, comprising a housing and a lift head, where the lift head is adapted to hold a pallet, the object of the invention is achieved in that the lifting device comprises a linear actuator attached to a lift head, where said linear actuator is adapted to lift a pallet from a first, low position at the conveyor track to a second, raised position that is substantially vertical above the first position so that a second pallet can pass underneath the raised pallet.

By this first embodiment of the lifting device according to the invention, a lifting device that can lift an object from a position at a conveyor track to a raised position above the first position is provided. This is advantageous in that the object is moved from the regular flow of the conveyor system, allowing the regular flow to continue without disruption.

In an advantageous development of the invention, the lift head displays a first, open state and a second, closed state. This allows the lift head to hold a pallet when the pallet is to be raised, and at the same time allows for an easy release of the pallet.

In an advantageous development of the invention, the lift head comprises a spring shaft that opens the lift head when the spring shaft bears on a hold surface. The advantage of this is that the lift heads do not require separately powered opening and release means.

In another advantageous development of the invention, the spring shaft bears on the hold surface when the lifting device is in the first, low position. The advantage of this is that the lift head is opened at the same time as the lift head reaches the low position. This means that the lift head will always be open when the lift head is in the low position. A closed lift head in the low position, obstructing the pallet flow, is thus avoided.

In an advantageous further development of the invention, the lift head is closed by a clamping spring. This is advantageous in that the lift head will be closed when it is in any position but the low position.

In an advantageous further development of the invention, the lift head is opened by a separate opening means. This is advantageous in that it allows the lift head to be opened in the raised position.

In an advantageous further development of the invention, the lifting device comprises a compressed air cylinder for the movement of the pallet from the first to the second position. This is advantageous in that compressed air is a clean and cheap power source.

In an advantageous further development of the invention, the lift head comprises a locating pin adapted to interact with a locating bushing in a pallet. This is advantageous in that an increased safety and accuracy can be obtained. To further increase the accuracy, the lift head may also comprise a recess adapted to the shape of the pallet.

In an advantageous further development of the invention, the lifting device further comprises a second housing with a second linear actuator being attached to a second lift head. This is advantageous in that the load capacity and the accuracy of the lifting device can be improved.

In a first embodiment of the conveyor system, the conveyor system comprises an inventive lifting device. In this way, a conveyor system in which work can be performed on one object at the same time as another object passes underneath is obtained. This allows for an efficient conveyor system.

In an advantageous further development of the conveyor system, the system comprises a plurality of inventive lifting devices, where the lifting devices are positioned close to each other, and where one lifting device is used to raise and/or lower a pallet at the same time as another lifting device holds a pallet in the raised position, allowing a work station to perform an operation on an object held by that pallet. This is advantageous in that the efficiency of the conveyor system is improved further.

In a first embodiment of the method for lifting objects which are conveyed along a conveying track comprising a conveyor chain and guide rails, said objects being conveyed on pallets, the object of the invention is achieved by the steps of stopping a first pallet at a predefined position at a first lifting device, fixating the pallet to the lifting device by clamping the pallet between a support plate and a clamping plate, and raising the pallet from a first, low position to a second, raised position with the lifting device. The advantage of this is that a method of raising an object is obtained, in which the object is moved out of the regular flow of the conveyor system in an easy and flexible way.

In an advantageous further development of the invention, the method comprises the step of holding a second pallet in the second, raised position with a second lifting device simultaneously as the first pallet is raised with the first lifting device. The advantage of this is that a pallet can be raised at the same time as work is performed on an object held by another pallet. The work station can thus be used in an efficient way.

In an advantageous further development of the invention, the method comprises the step of holding the first pallet in the second, raised position with the first lifting device simultaneously as the second pallet is lowered with the second lifting device. The advantage of this is that a pallet can be lowered at the same time as work is performed on an object held by another pallet. The work station can thus be used in an efficient way.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1A:
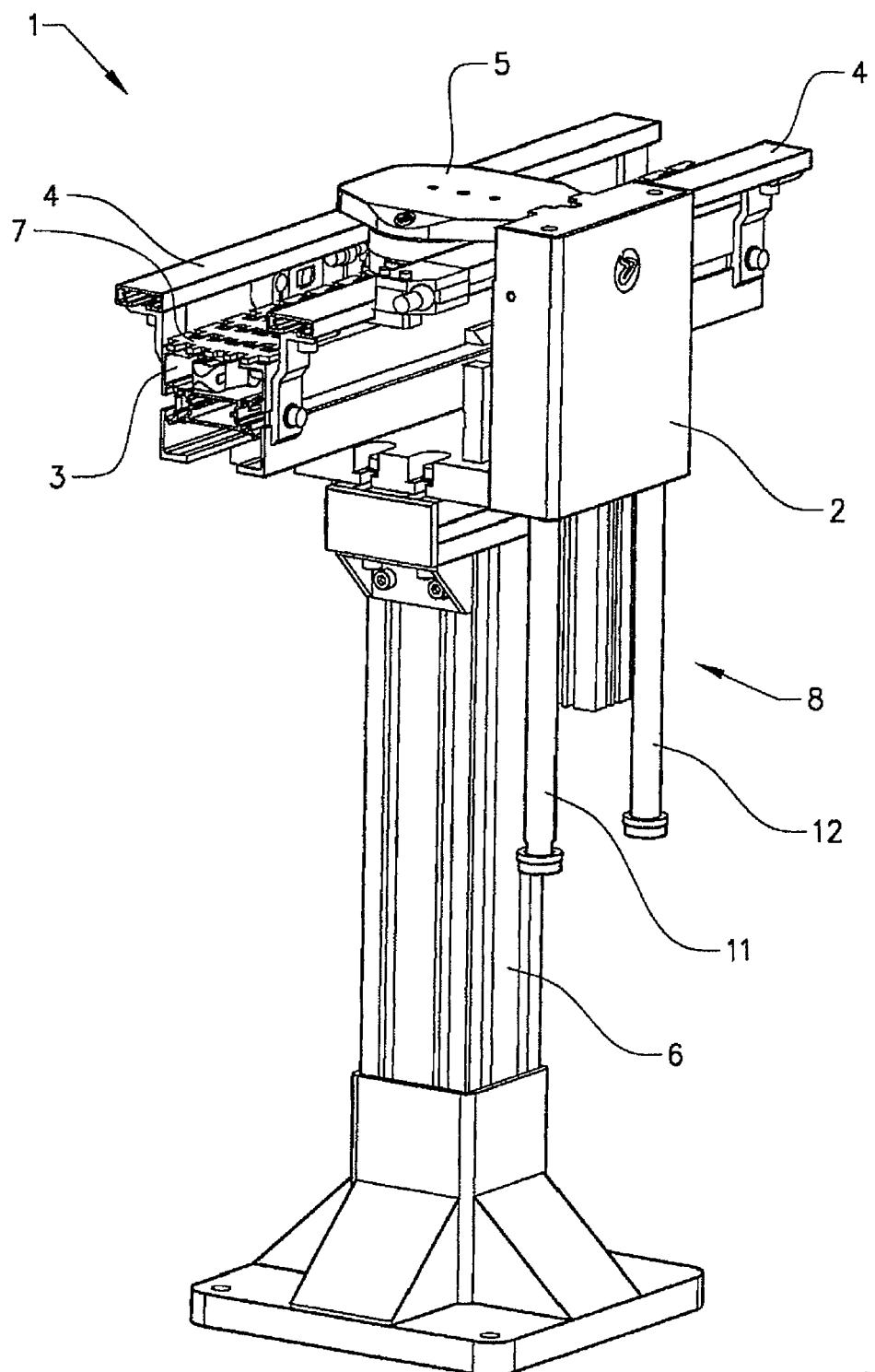
FIG. 1a shows a first embodiment of a lifting device according to the invention.
Figure 1B:
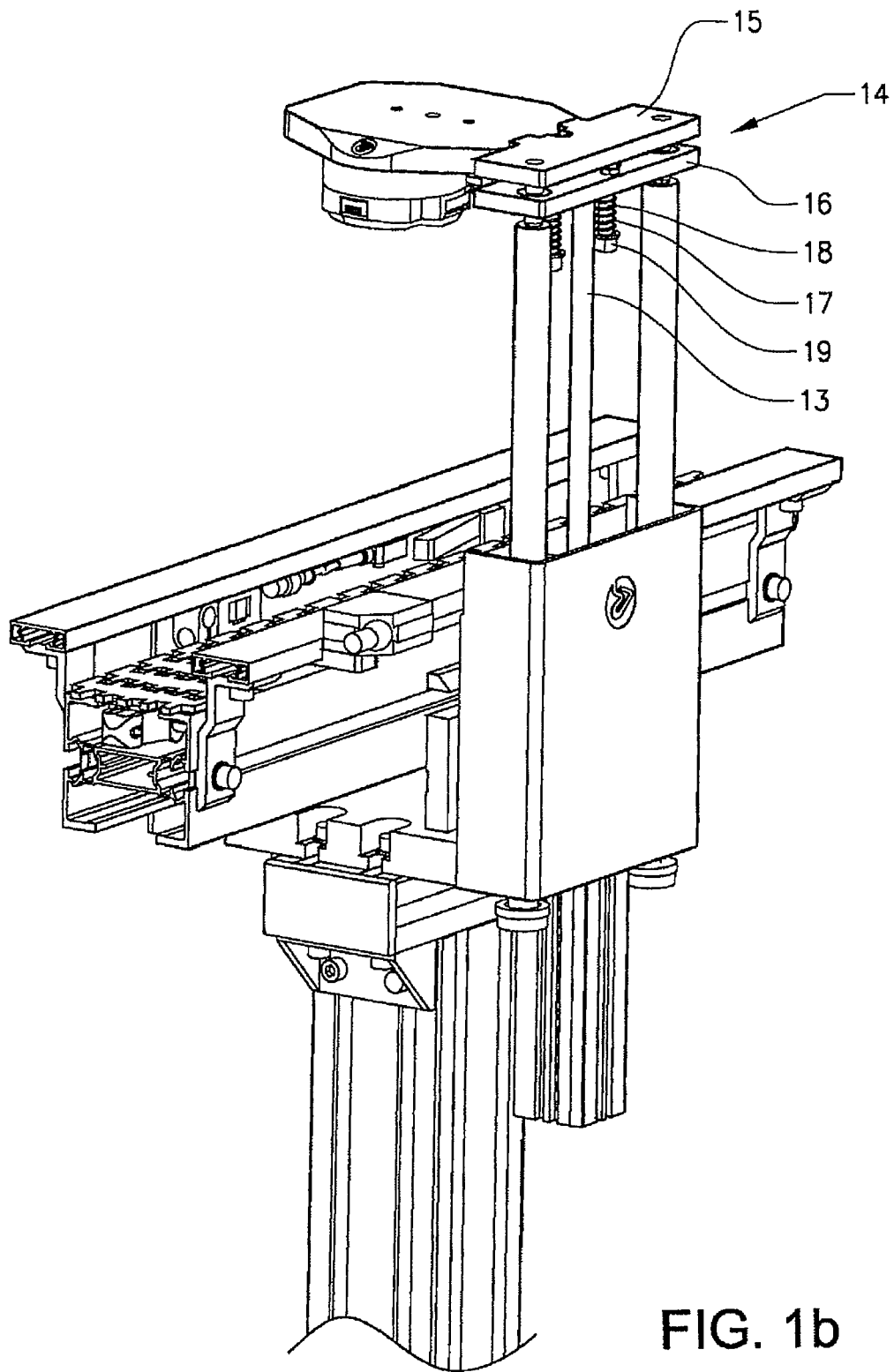
FIG. 1b shows the lifting device according to FIG. 1a in a raised position.

FIGS. 1a and 1b show a first embodiment of a lifting device for a conveyor system according to the invention. The lifting device 1 comprises a housing 2 attached to some kind of support structure, e.g. to a stand 6. A conveyor track 3 comprising a drive chain 7 and guide rails 4 is also attached to the support structure. The conveyor track is adapted to convey pallets 5 in a known manner. A conveyor track of this type is well-known to the skilled person and is not described further.

The housing 2 of the lifting device is positioned on one side of the conveyor track. In one embodiment, the housing is attached to the support structure and the conveyor track is thereafter attached to the housing. The attachment means for the conveyor track is in this embodiment integrated with the housing. This is advantageous when the lifting device is part of the original system, i.e. is designed in the system. In another embodiment, the housing is attached to the support structure after the conveyor track is mounted. The housing is in this embodiment free-standing and may be mounted to the support structure at any time. This is advantageous when the production flow is altered or when a new product or version is introduced to the product flow. In this way, the conveyor track does not have to be rebuilt in order to mount the lifting device.

The lifting device comprises a linear actuator 8 mounted in the housing. The linear actuator can be powered in various ways, e.g. by electricity or pressurised air, but also hydraulic linear actuators are possible to use. The power source is selected e.g. depending on the type of energy source available and the type of required control means. If the system uses pressurised air, which is common in conveyor systems, it may be of advantage to use pressurised air also to power the linear actuator.

The linear actuator 8 comprises in this example two shafts, a first shaft 11 and a second shaft 12. The purpose of the shafts is to support and guide the lift head and to allow a smooth movement of the lift head. The shafts are supported in the housing in a low friction way, e.g. by sliding bearings, so that a smooth movement is achieved. Preferably, each shaft is supported by one bearing in the bottom region of the housing and one bearing in the top region of the housing in order to obtain a truly linear movement. The shafts are attached at the top ends by a lift head. The shafts 11, 12 are attached to a lift head 14. The number and shape of the shafts may be chosen in different ways, as long as a proper movement is obtained. Square or triangular shafts are e.g. plausible.

The linear actuator further comprises a drive piston 13, fixedly attached to the clamping plate 16 of the lift head 14. The drive piston will move the head of the lifting device between a first, low position and a second, raised position. The drive piston is in this example the piston of a compressed air cylinder. The drive piston 13 may also be the threaded screw of an electric driven linear actuator, or may be any suitable drive means depending on the selected power source.

Figure 3A:
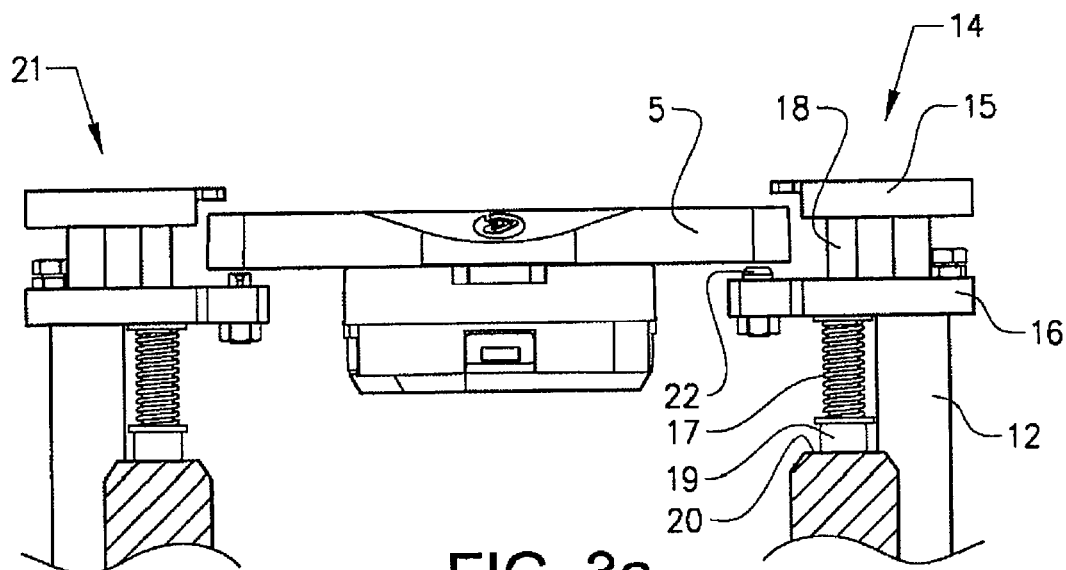
FIG. 3a shows the lift head of the lifting device in an open state.
Figure 3B:
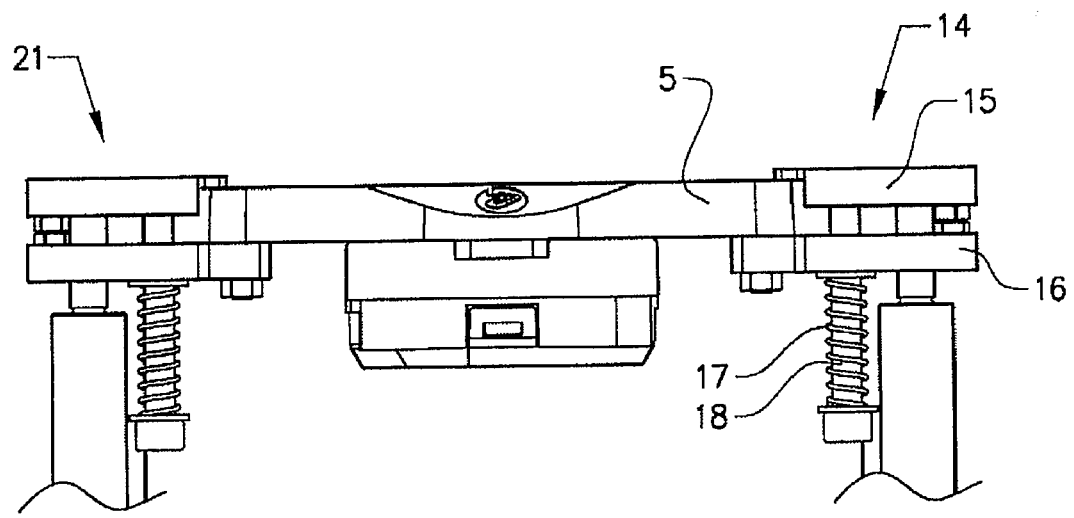
FIG. 3b shows the lift head of the lifting device in a closed state.

The lift head 14, shown in FIGS. 3a and 3b, comprises a support plate 15 to which the shafts 11, 12 are rigidly fixated. A clamping plate 16 is positioned somewhat below the support plate 15. The clamping plate is slidable guided by the shafts 11, 12, i.e. the shafts extend through two holes in the clamping plate. The clamping plate and the support plate are connected to each other by a clamping spring 17 and a spring shaft 18. The first end of the spring shaft 18 is fixated to the support plate 15 and extends through a hole in the clamping plate 16. The spring shaft is provided with a head 19 at the second end. The clamping spring 17 is positioned between the head 19 and the clamping plate 16. In this way, the clamping spring will force the support plate and the clamping plate towards each other with a force which depends on the selected spring.

The lift head 14 is provided with a protrusion in the form of a locating pin 22 that fits in a locating bushing integrated in the pallet. It is also possible to provide the clamping plate with a shape, e.g. a recess in the support plate and/or the clamping plate that is adapted to the shape of the pallet that is to be lifted. By such an adaptation, the pallet will be held securely in place and a slight misalignment of the pallet during the stopping of the pallet can be compensated for.

The lifting device can be in either of two positions, a first, low position as seen in FIG. 1a and a second, raised position as seen in FIG. 1b. In the first, low position, the lift head of the lifting device is at the same level as the conveyor track. In this position, the lift head is open and allows a pallet to pass the lifting device without interference. In the second, raised position, the head is closed in order to hold a pallet in a raised position. Thus, in this position, the support plate and the clamping plate are forced together by the clamping spring, i.e. the head is closed. In the raised position, an operation on the object transported by the pallet can be performed by a work station. It is also possible to use the raised position as a means to let another object pass the raised object.

When the lift head of the lifting device is in the first, low position, the head will be open. FIG. 3a shows the lift head 14 in an open state and FIG. 3b shows the lift head 14 in a closed state where the head is raised. In the open state, the head 19 of the spring shaft 18 will bear on a hold surface 20 in the lifting device. To reach the opened state, i.e. to place the lifting device in the first, low position, an appropriate signal is sent to the lifting device. The drive piston will retract into the cylinder, pulling the lift head 14 down towards the low position. The head 19 of the spring shaft 18 will reach the hold surface 20 and will stop there, bearing on the surface. At the same time, the support plate will stop at its lowest position, since the support plate is fastened to the spring shaft. The drive piston will continue pulling the clamping plate further down, compressing the clamping spring 17. When the drive piston is completely retracted, the clamping plate has reached its lowest position. The support plate and the clamping plate are as far apart as possible and the head 14 is opened.

When a pallet has stopped at the lifting device and a lift signal is sent to the lifting device, the drive piston will extend out of the cylinder. This will move the clamping plate upwards, towards the lower side of the pallet. When the clamping plate reaches the pallet, the pallet will be lifted slightly so that it bears on the support plate. The support plate is kept at its lowest position by the clamping spring until the pallet reaches the support plate. When the drive piston continues to extend out of the cylinder, the pallet will be held between the support plate and the clamping plate. The support plate will thus be pushed upwards only when the pallet is securely held by the lift head. When the pallet is held firmly between the support plate and the clamping plate by the clamping spring, the pallet will be raised by the drive piston towards the raised position.

When the lifting device is in the low position, pallets can pass the lifting device without having to stop at the lifting device. This is possible because the head of the lifting device is opened and neither of the support plate nor the clamping plate extends into the path of the pallet. Since the closing action of the lifting device is integrated with the lifting action, an erroneous closing of the lifting device at its low position is avoided. Thus, a closed lift head obstructing the flow of the conveyor system is avoided.

If a pallet is to be raised to the raised position, the pallet is stopped at the lifting device. The pallet is stopped at the lifting device either by stopping the conveyor chain or by using a special stop mechanism at the stop position. The type of stop used is determined by the type of system used and the required accuracy. The lifting device will then lift the pallet to the raised position as described above. In the raised position, a work station can be positioned, in which some type of action can be performed on the goods transported by the pallet. By mounting a lifting device according to the invention to an existing conveyor system, a flexible way to retroactively add a work station to a conveyor system is obtained. The added work station does not hinder the regular work flow of the conveyor system. Further, it allows other pallets to pass the work station when an operation is performed at the work station. If the goods on the pallet are not required to stop at the work station, the pallet can just pass the work station without having to stop at all.

When the pallet has been in the raised position, the lifting device is lowered when the lifting device receives a lowering signal. The device is lowered by, in this case, the drive piston retracting into the cylinder. When the head of the spring shaft touches the hold surface, the support plate and the clamping plate starts to part, letting the pallet loose. When the low position is reached, the pallet is free to continue to move along the conveyor track.

The clamping action of the lift head can also be achieved in other ways. It is possible to use an active locking head, driven by e.g. pressurised air and controlled separately from the lifting action. Such a clamping action has the advantage that the pallet can be released also in the raised position, should there be a need. A disadvantage is that the energy for the locking head must be available at the head of the lifting device and not only at the housing of the lifting device. Such a solution will also require more control lines.

Figure 2A:
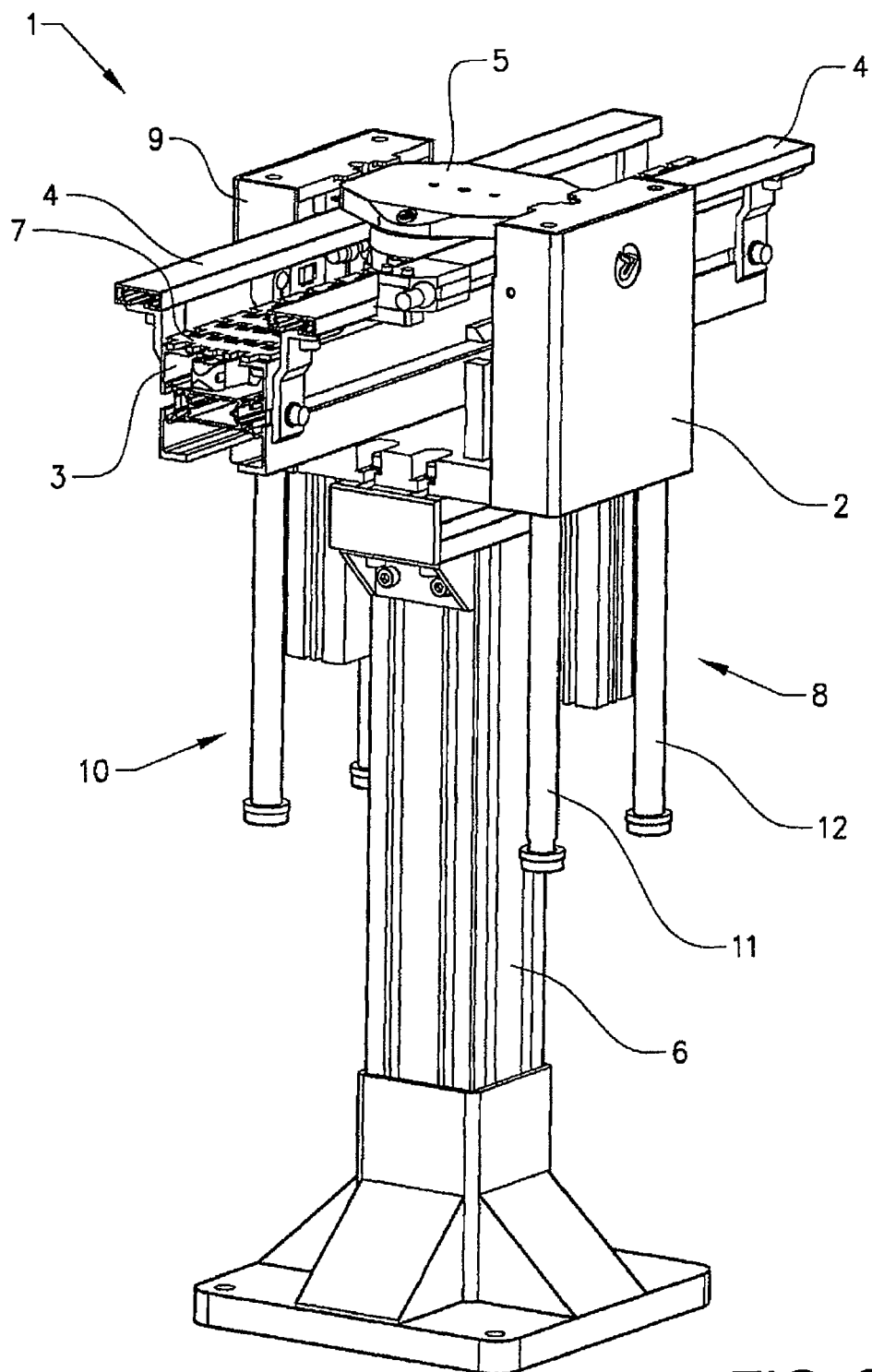
FIG. 2a shows a second embodiment of a lifting device according to the invention.
Figure 2B:
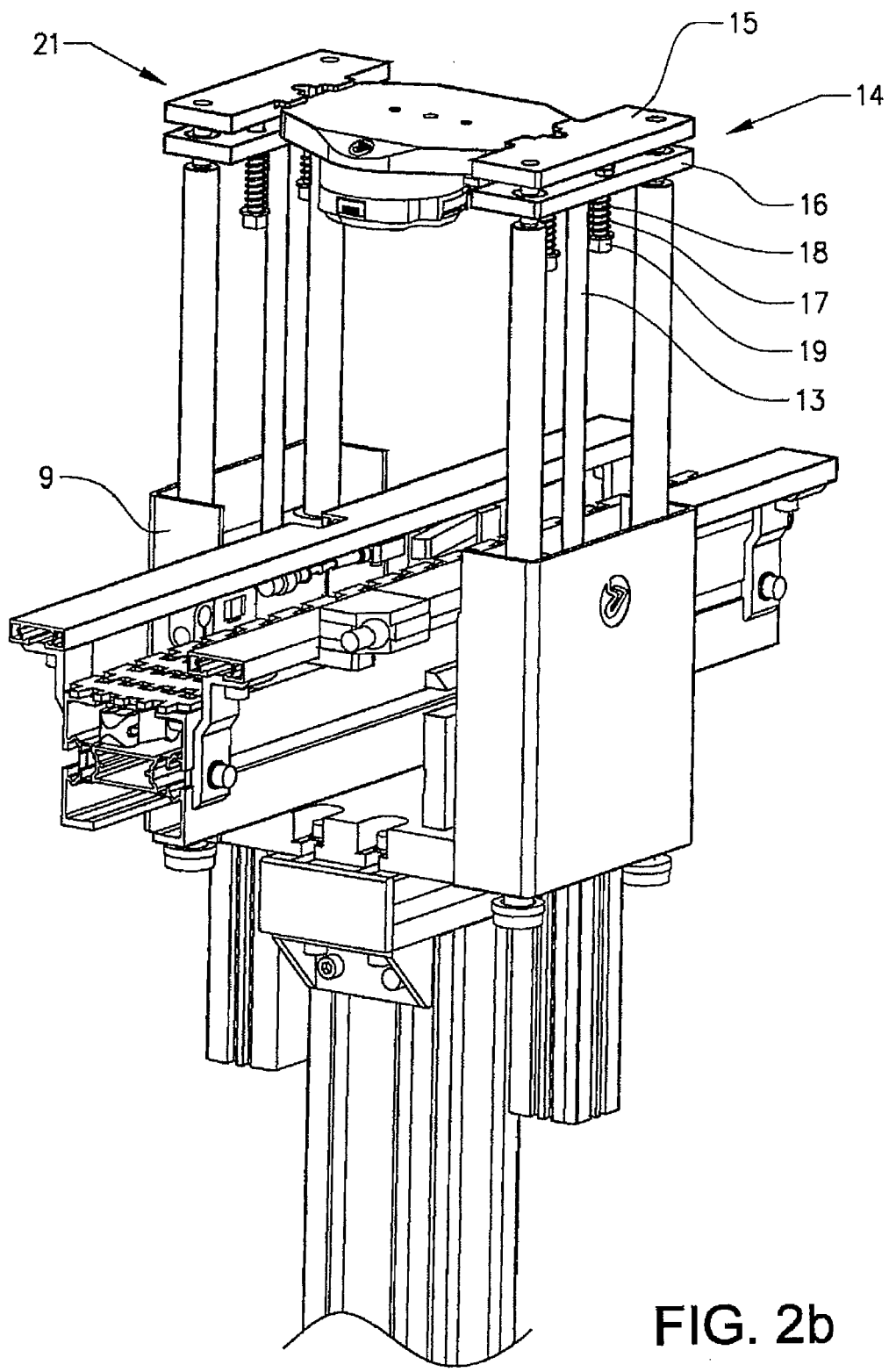
FIG. 2b shows the lifting device according to FIG. 2b in a raised position.

In a second embodiment of the inventive lifting device, shown in FIGS. 2a and 2b, the lifting device comprises a first housing 2 and a second housing 9. The first housing 2 is described above. The second housing 9 is in this embodiment more or less identical to the first housing 2. It is of course possible to design the second housing in a different manner in order to adapt the lifting device to specific requirements. By designing the housing 2 with linear actuator 8 and lift head 14 in a symmetrical manner, it is possible to use the housing on both sides of the conveyor track, acting as both the first and the second housing. The second housing comprises a second linear actuator 10, similar or identical to the linear actuator 10 described above. The second actuator is mounted to a second lift head 21 being similar or identical to the first lift head 14.

Both the first housing and the second housing are mounted to the support structure of the conveyor system, e.g. to a stand 6, in the same way as described above. The first housing is in this example mounted on the right side of the conveyor track, as seen in the travelling direction of the conveyor chain, and the second housing is in this example mounted on the left side of the conveyor track.

When an object is to be raised by the lifting device, a signal is sent to the two linear actuators 8, 10 by the control system of the conveyor system. The two linear actuators will simultaneously raise the pallet with the object to the raised position. At the same time, the two lift heads 14, 21 will simultaneously clamp the pallet between the support plate and the clamping plate of the lift heads, thereby holding the pallet in a firm grip. One advantage of using two linear actuators and two lift heads to raise a pallet is that the load capacity of the lifting device is increased. Another advantage is that the accuracy is increased. This is especially advantageous when an operation that puts stress on the pallet is performed on an object, e.g. drilling or mounting of parts.

In a further embodiment of the inventive lifting device, the linear actuators of both sides of the lifting device, i.e. linear actuators 8 and 10, are driven by one power source. In one example, the two linear actuators are powered by one compressed air cylinder, and the drive piston of the pressurised air cylinder is connected to both linear actuators. This can be done e.g. by placing the pressurised air cylinder at the stand of the conveyor system. In this way, it is secured that both sides of the lifting device will lift simultaneously.

In a further embodiment of the inventive lifting device, the lifting device comprises a plurality of housings with a linear actuator and a lift head, positioned side by side at the conveyor track. This is advantageous when e.g. a robot or the like performs an operation on the raised object. By using two or more lifting devices positioned side by side, one lifting device can raise an object to the work station at the same time as an operation is performed on an object held by another lifting device. Depending on the operation time, one of the lifting devices or a third lifting device can be used to lower an already processed object when work is performed on a raised object. In this way, the work station can be used in an efficient way.

The invention is not to be regarded as being limited to the embodiments described above, a number of additional variants and modifications being possible within the scope of the subsequent patent claims.

REFERENCE SIGNS

1: Lifting device
2: Housing
3: Conveyor track
4: Guide rail
5: Pallet
6: Stand
7: Drive chain
8: Linear actuator
9: Second housing
10: Second linear actuator
11: First shaft
12: Second shaft
13: Drive piston
14: Lift head
15: Support plate
16: Clamping plate
17: Clamping spring
18: Spring shaft
19: Spring shaft head
20: Hold surface
21: Second lift head
22: Locating pin

The invention claimed is:

1. A lifting device for a conveyer system, comprising:
   a housing and a lift head, where the lift head is adapted to hold a pallet, where the lifting device is adapted to be mounted on one side of an endless drive chain without interrupting the drive chain,
   wherein the lifting device comprises a linear actuator attached to a lift head, where the lift head is mounted on top of the linear actuator, where the lift head is adapted to grip the pallet from one side, where said linear actuator is adapted to lift a pallet from a first, low position at the conveyor track in which the lift head is at the same level as the conveyor track to a second, raised position that is substantially vertical above the first position so that a second pallet can pass underneath the raised pallet.

2. The lifting device according to claim 1, wherein the lift head displays a first, open state and a second, closed state.

3. The lifting device according to claim 2, wherein the lift head comprises a spring shaft that opens the lift head when the spring shaft bears on a hold surface.

4. The lifting device according to claim 3, wherein the spring shaft bears on the hold surface when the lifting device is in the first, low position.

5. The lifting device according to claim 1, wherein the lift head is closed by a clamping spring.

6. The lifting device according to claim 1, wherein the lift head is opened and closed by a separate opening means.

7. The lifting device according to claim 1, wherein the lifting device comprises a drive piston powered by compressed air.

8. The lifting device according to claim 1, wherein the lift head comprises a locating pin adapted to interact with a locating bushing in the pallet to be held.

9. The lifting device according to claim 1, wherein the lift head comprises a recess adapted to the shape of the pallet to be held.

10. The lifting device according to claim 1, wherein the device further comprises a second housing with a second linear actuator being attached to a second lift head.

11. A system comprising:
    a conveyor system including a lifting device including a housing and a lift head, where the lift head is adapted to hold a pallet, where the lifting device is adapted to be mounted on one side of an endless drive chain without interrupting the drive chain,
    wherein the lifting device comprises a linear actuator attached to a lift head, where the lift head is mounted on top of the linear actuator, where the lift head is adapted to grip the pallet from one side, where said linear actuator is adapted to lift a pallet from a first, low position at the conveyor track in which the lift head is at the same level as the conveyor track to a second, raised position that is substantially vertical above the first position so that a second pallet can pass underneath the raised pallet.

12. The system according to claim 11, wherein the system comprises a plurality of lifting devices, where the lifting devices are positioned close to each other, and where one of the plurality of lifting devices is used to raise and lower a pallet at the same time as another one of the plurality of lifting device holds a pallet in the raised position, allowing a work station to perform an operation on an object held by the pallet.

13. A method for lifting objects which are conveyed along a conveying track comprising an endless conveyor chain and guide rails, the lifting objects being conveyed on pallets, the method comprising:
    stopping a first pallet at a predefined position at a first lifting device, where the lifting device comprises a lift head mounted on top of the lifting device;
    fixating the pallet to the lifting device by clamping the pallet between a support plate and a clamping plate; and
    raising the pallet from a first, low position at the conveyor track in which the lift head is at the same level as the conveyor track, to a second, raised position that is substantially vertical above the first position.

14. The method according to claim 13, including:
  moving the pallet from the first, low position to the second, raised position using a linear actuator.

15. The method according to claim 13, wherein the method further comprises:
  holding a second pallet in the second, raised position with a second lifting device simultaneously as the first pallet is raised with the first lifting device.

16. The method according to claim 15, wherein the method further comprises:
  holding the first pallet in the second, raised position with the first lifting device simultaneously as the second pallet is lowered with the second lifting device.

* * * * *

UNITED STATES PATENT AND TRADEMARK OFFICE
CERTIFICATE OF CORRECTION

PATENT NO.       : 8,430,229 B2
APPLICATION NO.  : 12/677254
DATED            : April 30, 2013
INVENTOR(S)      : Göran Abbestam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

Eighth Day of September, 2015

Michelle K. Lee
*Director of the United States Patent and Trademark Office*